G. C. BEIDLER.
FLYING MACHINE.
APPLICATION FILED JUNE 24, 1909.
1,099,146.
Patented June 2, 1914.
6 SHEETS—SHEET 5.
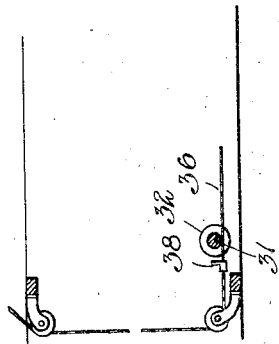
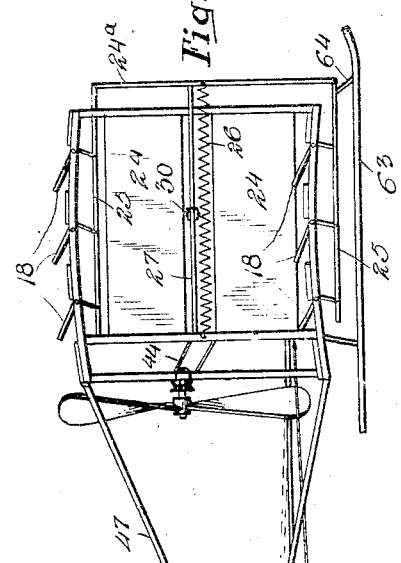
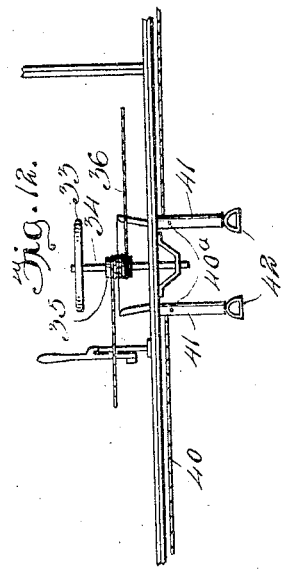
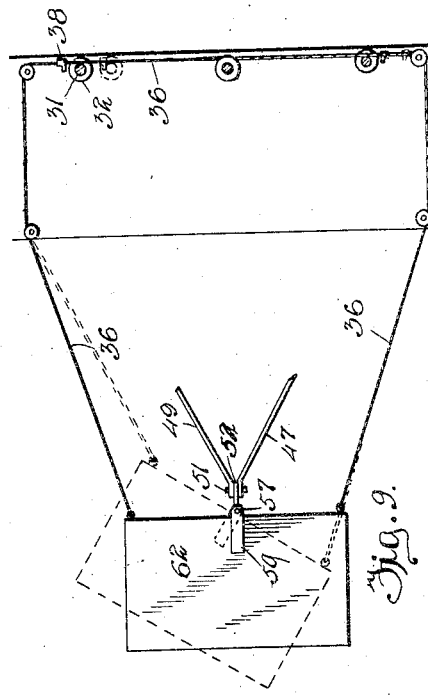
Inventor
George C. Beidler
By Frank S. Appleman
Attorney
Witnesses
G. M. Spring
L. E. Barkley

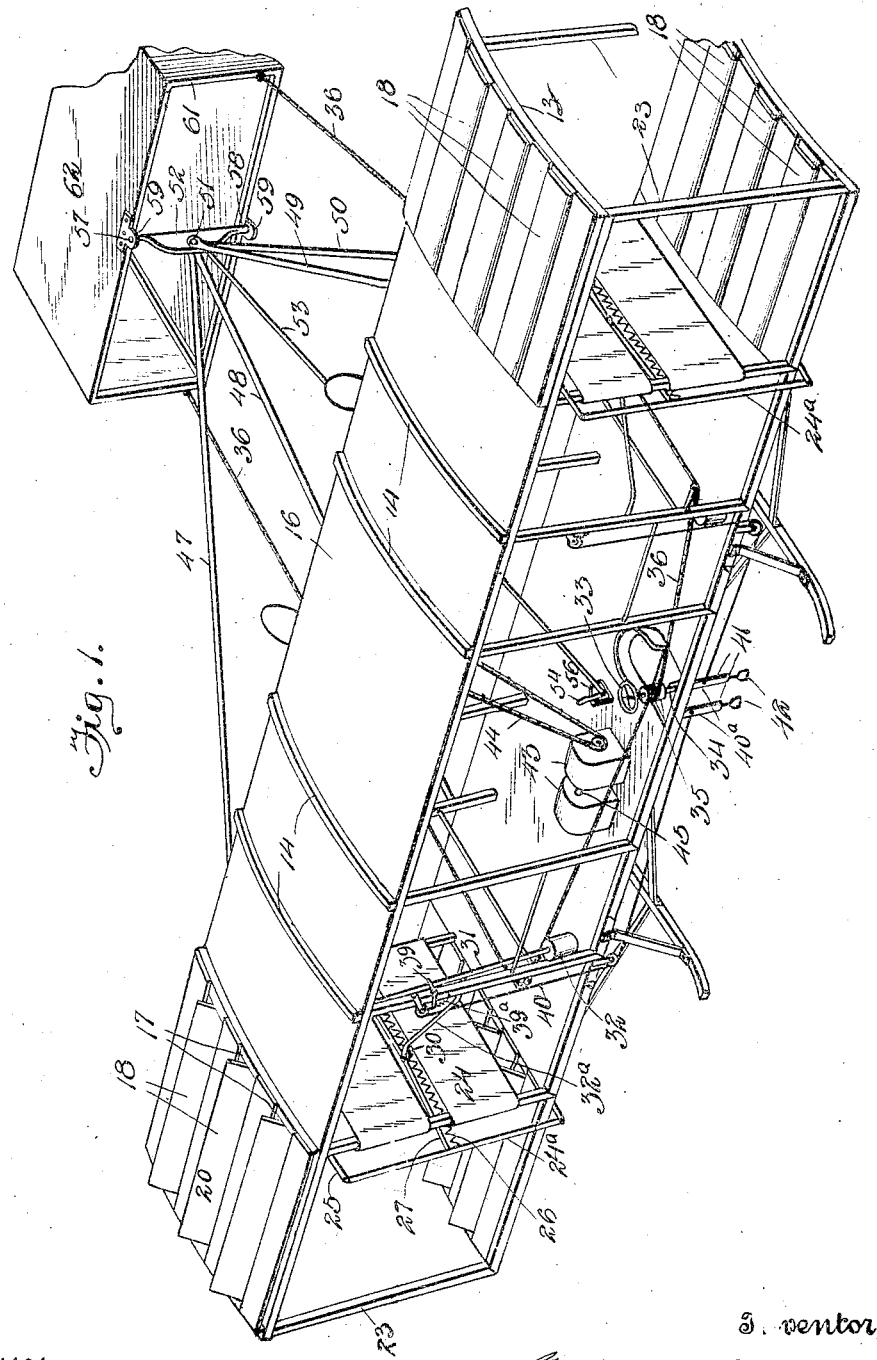

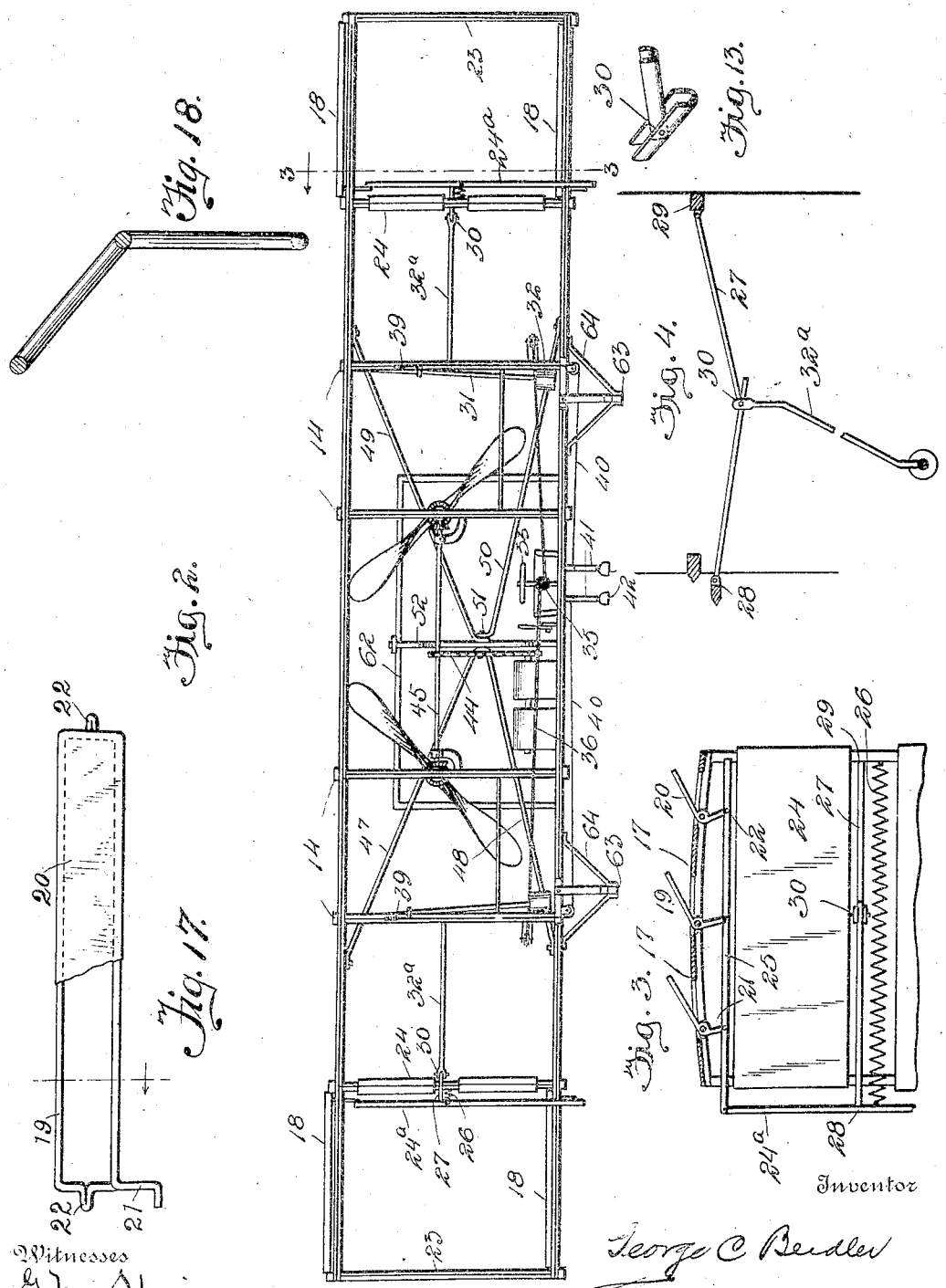

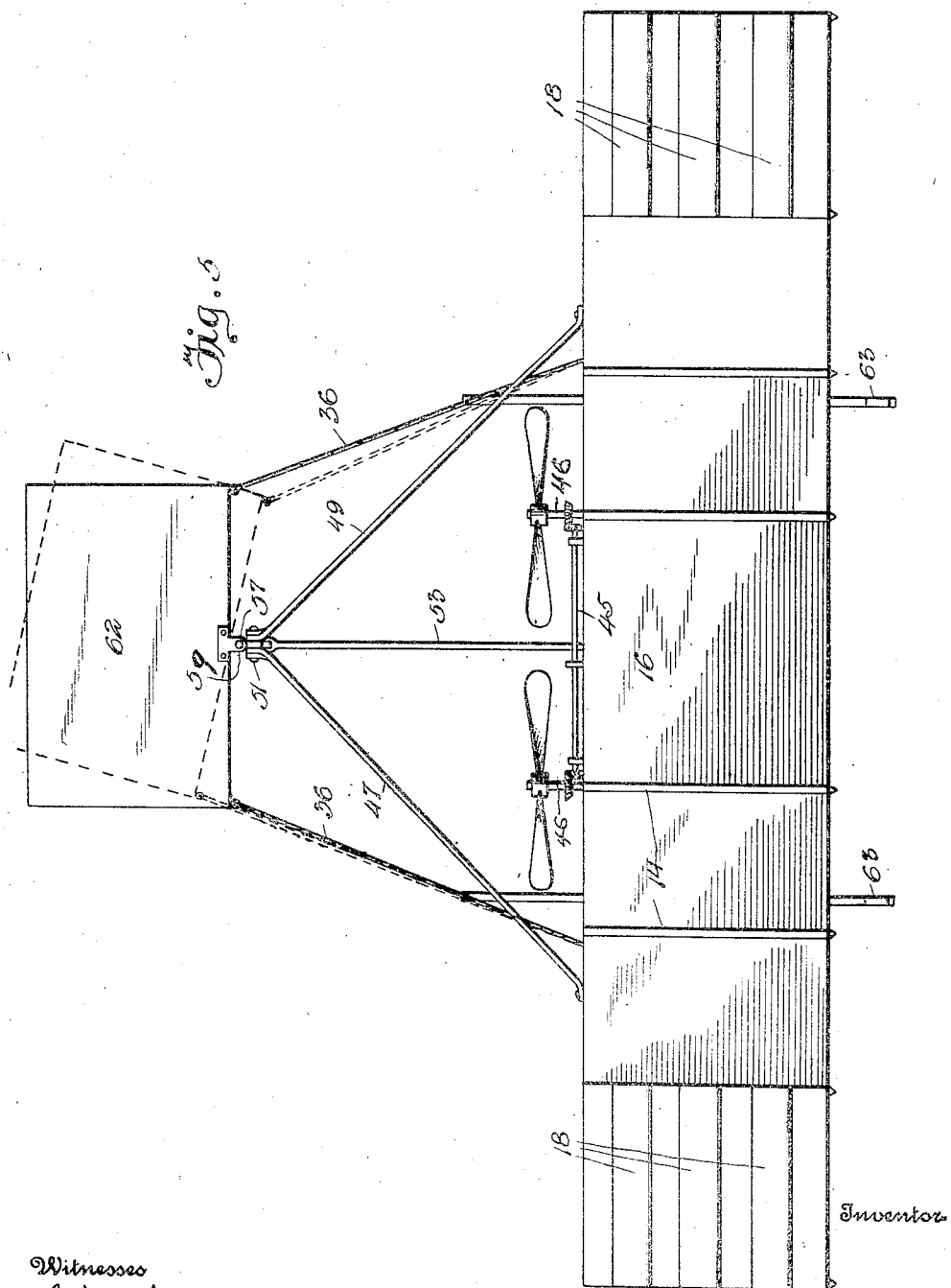

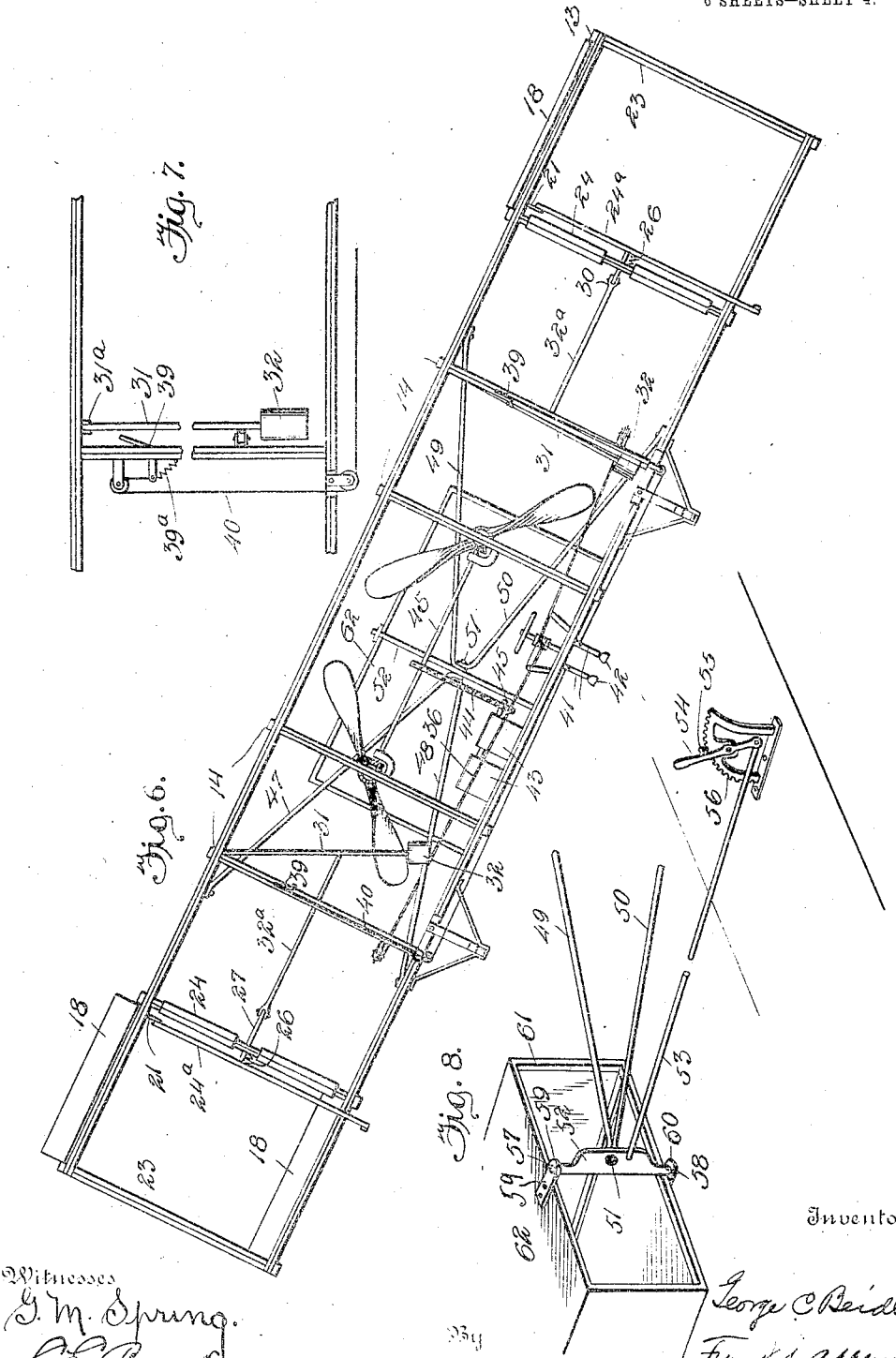

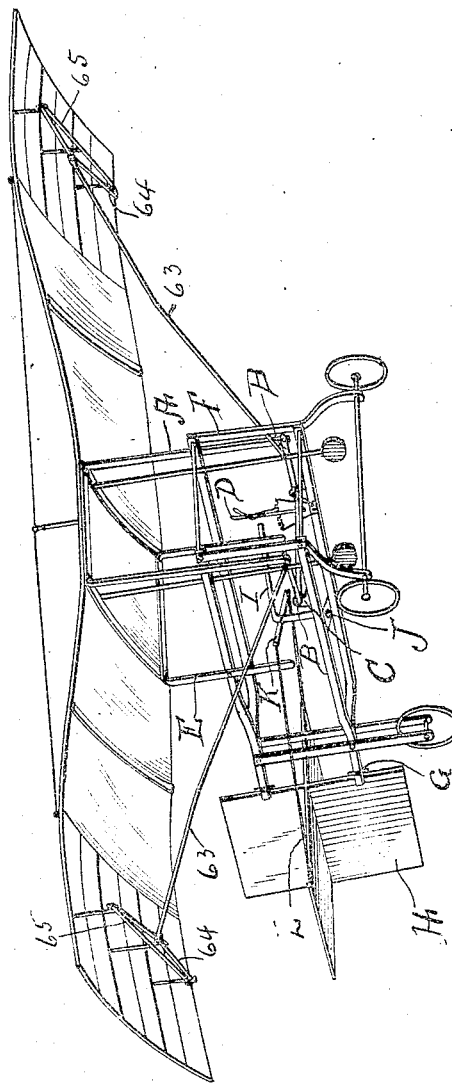

UNITED STATES PATENT OFFICE.

GEORGE C. BEIDLER, OF ROCHESTER, NEW YORK.

FLYING-MACHINE.

1,099,146.  Specification of Letters Patent.  Patented June 2, 1914.

Application filed June 24, 1909. Serial No. 504,086.

*To all whom it may concern:*

Be it known that I, GEORGE C. BEIDLER, a citizen of the United States of America, and resident of Rochester, in the county of Monroe and State of New York, have invented certain new and useful Improvements in Flying-Machines, of which the following is a specification.

This invention relates to flying machines and particularly to a machine of this character employing aeroplanes.

An object of this invention is to produce a flying machine having its aeroplanes provided with movable shutters automatically controlled or operated preferably through mechanism thrown into action when the aeroplanes tilt from the approximately horizontal plane.

While I have given the name "shutter" to the controlling device which is utilized for closing or partially closing openings in the aeroplanes, I wish to be understood that any means for increasing or diminishing the area of the aeroplanes or for closing or restricting the opening therein to control the passage of air therethrough will come within the scope of the term "shutter" and so called vanes, valves and hinged or sliding shutters may be regarded as the equivalent of the elements that I herein illustrate for accomplishing the result.

Furthermore an object of this invention is to provide means whereby the said shutters may be manually operated for the purpose of guarding or unguarding openings in the aeroplanes.

In use, a flying machine employing aeroplanes may be thrown out of equilibrium by air currents acting on opposite ends thereon unequally; that is to say the pressure may increase or diminish at one end or the other and cause the machine to tilt, as stated, and it is desirable to have means for relieving the pressure at one end while maintaining all possible resistance at the opposite end for, by this means the end at which a resistance is partially removed may descend to the level of the end at which the resistance is maintained and I have found that by automatically controlling the shutters, the aeroplanes will ride evenly and practically horizontal. I have also found that by partially removing the resistance at one end thereby tilting the aeroplanes slightly, the machine may be made to travel in a circle or to turn from a straight course and I therefore have for the further object of the invention the provision of novel means for manually operating the shutters in order that an increased or diminished resistance may be created when the machine is to be turned from a straight course or for other purposes.

At such time as the shutters are being manually operated, it is desirable and it is an object of this invention to provide means whereby the automatically actuated mechanism for imparting movement to the shutters may be under the control of the operator.

A still further object of this invention is to provide a rudder or tail-piece for guiding the machine, the said guiding means being provided with connections for effecting adjustments thereof transversely and vertically.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1 illustrates a view in perspective of a flying machine, embodying the invention; Fig. 2, illustrates a view in elevation of the front of the machine; Fig. 3, illustrates a transverse vertical sectional view on the line 3—3 of Fig. 2, with parts of the machine removed; Fig. 4, illustrates a sectional view of part of the means for moving the shutters; Fig. 5, illustrates a top plan view of the machines; Fig. 6, illustrates a view in elevation of the front of the machine in a tilted position; Fig. 7, illustrates a detail view of one of the weights utilized for actuating the shutters and parts associated therewith; Fig. 8, illustrates a perspective view of a fragment of the rudder and the connections thereto; Fig. 9, illustrates a detail view of the rudder-operating mechanism; Fig. 10, illustrates a detail view of a portion of the manually operated means for moving the shutters; Fig. 11, illustrates an end elevation of the machine; and Fig. 12 illustrates a detail view of a portion of the steering mechanism; Fig. 13 illustrates a perspective view of a fragment of a toggle on an enlarged scale; Fig. 14 is a perspective view of a flying machine of the monoplane type showing the application of the invention to a flying machine of that type. Fig. 15 illustrates shutters having movement either above or below the surface of the plane; Fig. 16 illustrates a shutter extending both above and below the plane when moved from a position in line with the plane. Fig. 17 illustrates a detail view of the shutter; Fig. 18, illustrates a vertical section therethrough.

In these drawings I have shown a flying machine of the bi-plane type, that is to say two aeroplanes are employed, one above the other and as one embodiment of the invention, I have shown the aeroplanes formed of rectangular frames 13, made of comparatively light material and having a series of ribs 14, thereacross, the said frames being provided with covers of light material, preferably a textile fabric of some suitable character, Fig. 14 of course showing a flying machine of the monoplane type.

The covering of each aeroplane at each end of the frame has a series of openings 17, therein, guarded by shutters 18. The shutters illustrated each comprise a frame 19, hinged in an opening of an aeroplane and having a cover 20, of cloth or the like, each of the said frames having an arm 21, and pintles 22, the latter of which are partially rotatable in the frame. The parts just described are duplicated in both aeroplanes and the aeroplanes are connected by posts 23, at the front and rear and at the corners, and said posts as well as the front of the frame are tapered in order that they will offer less resistance in their travel.

The posts at the front and rear of the frames next to those at the corners are connected by light material to form planes 24, which extend at right angles to the aeroplanes proper and the planes 24 serve to control the air in those parts of the aeroplanes having the openings. The shutters of the two aeroplanes are operated simultaneously from the same source. At each end a connecting bar 24ª is employed extending parallel to one of the posts and said bar has a rod 25, connected at each end thereof and each rod 25 extends practically parallel to and from front to rear of the aeroplanes and has operative connection with the arms 21 of the shutters, and movement of the rods 25, longitudinally will result in swinging the shutters on their pivots. A spring 26, is connected to the bar 24ª, and to one of the rear posts. The spring 26 might be termed a balance spring since its function is to balance the weight of the shutters in order that a very light gravity controlling means may be employed for effecting the movement of the shutters. The bar 24ª is further provided with a toggle 27, one end of which is pivoted to the bar at 28, and the opposite end 29, is pivoted to one of the posts. The intermediate portions of the toggle are connected by the pivot 30, and the end of one section of the toggle overlies the end of the opposite section of said toggle. The joint thus formed limits the movement of the members on their pivot and in one direction, in fact said joint is similar to an umbrella joint and the material forming the toggle is preferably U-shaped in cross section, in order that the end of the member which extends beyond the pivot will embrace the opposite member of the toggle and aid in strengthening the connection.

A pendulum lever 31, is suspended from the upper aeroplane through the medium of the bracket 31ª, one of said levers being provided for the sets of shutters on each end of the aeroplanes. Each lever 31, has an adjustable weight 32 and as said lever 31, will hang vertically any movement of the aeroplanes from the horizontal position will cause the posts to move with relation to the levers and such movement will be communicated to the toggles through the medium of a link 32ª, which connects the pendulum lever and toggle. By the action of the toggle just described, the bar 24ª will be drawn inwardly and the rods will be reciprocated and hence movement will be communicated to the arms of the shutters and the said shutters will be swung in their pivots. The movement of the shutters just described will unguard the openings in the aeroplanes and permit air to escape therethrough, thus relieving the pressure under the aeroplanes and permitting that side of the machine to descend.

When the machine tilts to effect the operation of the shutters at one side, the shutters on the opposite side are held closed, due to the action of the pendulum lever, and hence the shutters that are closed offer resistance to the air in order that the machine may be sustained at that side. When the air has escaped through the openings of the aeroplane to a degree to permit the aeroplanes to assume a practically horizontal position, the pendulum lever will act to close the shutters or at least to restrict the openings and offer greater resistance to the air passing through the said opening. By means of this device the effective area of the aeroplanes may be increased or diminished at either end. The mechanism just described will, as stated, automatically operate to maintain equilibrium of the aeroplanes and the machine, but have found it desirable to also provide means for manually controlling the shutters.

When the machine is to be turned to the right or left from a straight line one side that is the side toward which the machine to be turned, must be allowed to descend slightly in order that the aeroplanes may be tilted laterally. I, therefore, provide man ually operated means for swinging the pendulum levers or one of them at a time and I also provide means for holding one or the other of the pendulum levers parallel with its corresponding post.

For the purpose of swinging the pendulum lever, I provide a steering wheel 33, on a shaft 34, and journal said shaft in any appropriate way. I further provide said shaft with a drum 35, around which the flexible member 36, is wound, the ends of the said flexible member being attached to the rudder or tail, to be presently described. The flexible member 36, has fingers or shoulders 38 or their equivalents designed to communicate movement to one or the other of the pendulum levers in order that motion of the pendulum lever may be directed to the shutters on the side of the machine to be lowered through the mechanism heretofore described. For the purpose of retaining the pendulum lever which is not operated by the flexible connection against movement when the machine is tilted, I pivot latches 39, to the posts in juxtaposition to the pendulum lever and by connecting the ropes 40, or other flexible devices to them I may swing the noses of the latches to engage the pendulum lever as the machine is tilted. The latches 39 are under the control of the springs 39ª, by which the said latches are disengaged from the pendulum levers when the ropes 40 are released. As showing one embodiment of the invention for operating the latches, the ropes 40, are run over pulleys 40ª in the hollow hangers 41, and the ropes 40 have stirrups 42, to be engaged by the feet of an operator. The exact manner of operating the latches or manipulating the pendulum levers is an immaterial detail of construction and may be variously modified to suit particular requirements.

The machine is propelled by a motor of any appropriate type such as shown at 43, coupled by a sprocket chain 44, to a sprocket wheel on a shaft 45, and the shaft 45, is geared to the propeller shafts 46, in a manner to cause the propeller blades of one propeller to travel toward the propeller blades of the companion propeller.

Arms 47 and 48 extend rearwardly from the upper and lower planes respectively and converge. Arms 49 and 50, extend from the upper and lower aeroplanes respectively and also converge. The pairs of arms are provided with a pivotal pin 51, which pin 51, is common to all of them and the said pivotal pin 51, extends through a bracket 52, which bracket is pivoted to swing with relation to the arms. A rod 53, is connected to the bracket above or below the pivot and said rod has a lever 54, provided with a detent 55, acting in conjunction with a quadrant 56. Through the medium of the lever, the bracket is moved or swung with relation to the rods.

The ends of the bracket have trunnions 57 and 58 which enter apertures in ears 59 and 60 respectively. The ears are attached in any manner to the frame 61 of the box-tail or rudder 62 (hereinafter to be termed a rudder) and hence said rudder is permitted to swing horizontally on the trunnions under the influence of the flexible connections or vertically through the movement afforded the bracket under the control of the lever 54. The rudder is a box-like structure comprising a frame closed on four sides but having its front and rear ends open to permit air to pass therethrough.

A seat is provided for the operator and the motor can be placed on the aeroplanes in any appropriate position preferably in such relation to the passenger seat as to practically balance the machine when in travel.

It will be observed from the drawing that the pendulum levers, shutters and operating mechanism are duplicated on each side of the machine for the purposes heretofore set forth.

The lower aeroplane is provided with skids or runners 63, connected to the frame of the aeroplanes by braces 64, and these runners are provided as supports for the machine in starting and alighting.

As the operation of the several elements entering into the construction of the machine has been described, a résumé of the operation of the entire machine is believed to be unnecessary.

In Fig. 14, I have shown a flying machine having one plane provided with shutters, the said shutters being operated by pendulum levers through the medium of links 63, which links are connected to the braces 64, pivoted respectively to the frame of the aeroplane and to the ends of rods 65, which rods are connected to the arms of the shutters. The frame which depends below the aeroplane is here shown as provided with a truck and this machine is to be supplied with any appropriate propelling means, steering mechanism, etc.

The monoplane shown in the drawings has shutters, as heretofore stated, which are of the construction illustrated as being employed with the bi-plane type, although of course, I do not wish to be restricted with respect to the construction of the shutters for, they may be of the type illustrated in Fig. 16, where the said shutters have their pivots intermediate their widths and are connected to the operating mechanism by any appropriate means. In the monoplane, the front of the frame is supported by posts A, which have their lower ends connected to arms B, which arms rock in the brackets C under the influence of the lever D and as said arms oscillate, the posts A are reciprocated to elevate or lower the front of the plane. The rear of the plane is supported by the bracket E which is supported on the frame F. The rear end of the frame F is provided with the hinges G to which the rudder H is connected. The rudder may be swung on its hinges by the tiller I, which tiller is pivoted at J, and the tiller has a cross arm K with flexible connections L extending to the rudder.

I claim—

An aeroplane, substantially horizontally pivoted balancing wings, actuating means connected therewith and including means for holding the wings against movement, whereby one wing is so held when the other is tilted, and gravity controlled means for operating said actuating means.

In testimony whereof, I hereunto affix my signature in the presence of two witnesses.

GEORGE C. BEIDLER.

Witnesses:
LOTTIE E. BARKLEY,
A. M. LERCH.